(12) United States Patent
Runia

(10) Patent No.: US 6,181,132 B1
(45) Date of Patent: Jan. 30, 2001

(54) NMR LOGGING ASSEMBLY

(75) Inventor: Douwe Johannes Runia, Rijswijk (NL)

(73) Assignee: Shell Oil Company, Houston, TX (US)

( * ) Notice: Under 35 U.S.C. 154(b), the term of this patent shall be extended for 0 days.

(21) Appl. No.: 09/410,411

(22) Filed: Oct. 1, 1999

(30) Foreign Application Priority Data

Oct. 2, 1998 (EP) .................................................. 98308047

(51) Int. Cl.$^7$ ...................................................... G01V 3/00
(52) U.S. Cl. ............................................ 324/303; 324/322
(58) Field of Search .................................... 324/303, 322; 175/61, 320; 702/11

(56) References Cited

U.S. PATENT DOCUMENTS

| | | |
|---|---|---|
| 2,838,732 | 6/1958 | Brown . |
| 4,656,422 | * 4/1987 | Vail et al. ............................ 324/303 |
| 4,792,757 | 12/1988 | Vail et al. . |

FOREIGN PATENT DOCUMENTS

| | | | |
|---|---|---|---|
| 0 198 638 | * | 10/1986 | (EP) . |
| WO 00/20897 | * | 4/2000 | (WO) . |

OTHER PUBLICATIONS

International Search Report dated Nov. 24, 1999.

* cited by examiner

*Primary Examiner*—Christine Oda
*Assistant Examiner*—Brij B. Shrivastav

(57) ABSTRACT

A logging assembly for application in a wellbore formed in an earth formation is provided. The assembly comprises a casing suitable to be lowered through the wellbore and to be arranged in a selected part thereof, and a NMR logging device comprising magnetising means for inducing a magnetic field into a selected zone of the earth formation, antenna means for transmitting radio-frequency (RF) signals into the selected zone and for receiving response RF signals from the selected zone, and data collecting means for collecting data representing the response RF signals, which data collecting means is removably arranged in the interior of the casing. The means for inducing the magnetic field includes a magnetised section of the casing.

8 Claims, 1 Drawing Sheet

NMR LOGGING ASSEMBLY

FIELD OF THE INVENTION

The present invention relates to a logging assembly for application in a wellbore formed in an earth formation. More specifically the invention relates to an assembly for NMR logging, whereby a magnetic field is induced in a selected zone of the earth formation, and an antenna system transmits radio-frequency (RF) signals into the selected zone and receives response RF signals therefrom. NMR logging tools are generally applied to obtain information about the hydrogen contents of the formation.

BACKGROUND OF THE INVENTION

In operation the magnetic field aligns the magnetic moments of the hydrogen nuclei, and the transmitted RF signals re-orient the magnetic moments of the hydrogen nuclei. The rate at which the magnetic moments return to their aligned position provides information about the pores in which the liquids are residing. NMR logging tools are typically operated on wireline in a lower, open hole section of the wellbore.

WO-9803767-A discloses a logging method wherein a string of logging tools is arranged within a lower end part of a casing, referred to as the casing shoe track, to be positioned in the wellbore. The logging tools are operated during lowering of the casing shoe track through the open hole section of the wellbore. The string of logging tools is retrieved to surface after the casing has been installed. A problem of the known method arises if an NMR tool is to be included in the string because in order to achieve adequate magnetic field strength a magnet of relatively large size has to be applied in the tool string which thereby becomes of unacceptably large diameter. Conversely, if a small diameter magnet is used in order to keep the string dimension acceptable, the induced magnetic field is relatively weak.

It is therefore an object of the invention to provide an improved NMR logging assembly which induces a strong magnetic field into the formation and which does not have the limitations referred to above.

SUMMARY OF THE INVENTION

In accordance with the invention there is provided a logging assembly for application in a wellbore formed in an earth formation, the assembly comprising
  a casing suitable to be lowered through the wellbore and to be arranged in a selected part thereof; and
  a NMR logging device comprising magnetising means for inducing a magnetic field into a selected zone of the earth formation, antenna means for transmitting radio-frequency (RF) signals into the selected zone and for receiving response RF signals from the selected zone, and data collecting means for collecting data representing the response RF signals, the data collecting means being removably arranged in the interior of the casing; wherein the means for inducing the magnetic field includes a magnetised section of the casing.

DETAILED DESCRIPTION

Figure 1:
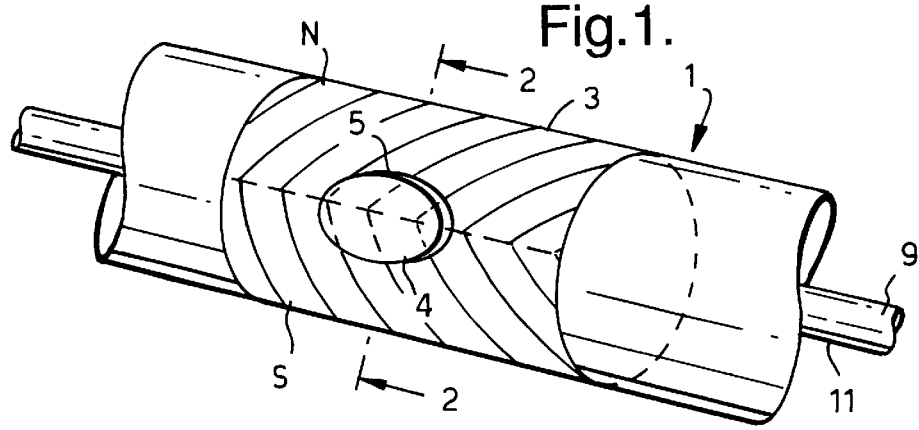
FIG. 1 schematically shows a perspective view of a first embodiment of the logging assembly according to the invention.

By using a section of the casing as the NMR magnet it is achieved that the magnet is of a large size and induces a strong magnetic field in the formation. This is in contrast to the prior art system where the NMR magnet has to fit in the logging tool string. Furthermore, the absence of a large magnet in a logging tool string allows the diameter of such string to be adequately small.

The invention will be described in more detail by way of example, with reference to the accompanying drawings.

In the Figures like reference numerals relate to like components.

Figure 2:
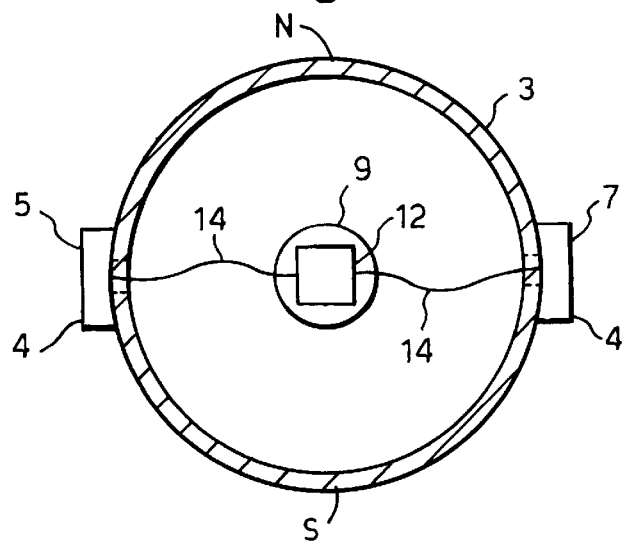
FIG. 2 schematically shows a cross-section along line 2—2 in FIG. 1.

Referring to FIGS. 1 and 2 there is shown a tubular casing 1 which is to be positioned in a wellbore (not shown). The casing 1 includes a magnetised casing section 3 with magnetic dipoles N and S at opposite sides of a plane (not shown) through the longitudinal axis of the casing 1. The magnetised casing section 3 is located in the lower end part of the casing 1, also referred to as the casing shoe-track. An antenna system 4 is provided at the outer surface of the magnetised casing section 3, which antenna system includes a pair of coils 5, 7 functioning both as transmitter of NMR radio-frequency (RF) signals into an earth formation (not shown) surrounding the wellbore and receiver of response RF signals from the earth formation. The coils 5, 7 are arranged at opposite sides of the magnetised casing section 3.

A logging string including a housing 9 extends concentrically through the casing 1 and is fixedly connected to the inner surface of casing 1 in a releasable manner. The housing 9 encloses an electronic system 12 for controlling the transmission of RF signals by the transmitter coils and for collecting data representing response RF signals received by the receiver coils. The electronic system 12 is thereto connected to the coils 5, 7 by conductor wires 14 and is provided with an electronic memory (not shown) for storing the data representing the response RF signals. The wires 14 are designed to break at a selected weak point upon removal of the logging string from the interior of the casing 1. The housing 9 is at its upper end provided with a latching mechanism (not shown) for latching to a wireline for retrieving the logging string through the wellbore to surface.

During normal operation the casing 1 is to be positioned in an open (i.e. uncased) section of the wellbore and is thereto lowered through the wellbore. As the magnetised casing section 3 passes through the open section of the wellbore the magnetised casing section 3 induces a magnetic field in a zone of the earth formation surrounding the open wellbore section. The magnetic field is relatively strong by virtue of the large size of the NMR magnet in the form of the magnetised casing section 3. Simultaneously the coils 5, 7 of the antenna system 4 are operated by the electronic system 12 so as to transmit RF signals into said zone of the formation and to receive response RF signals therefrom. By the arrangement of the coils 5, 7 at the outer surface of the casing it is achieved that the signal/noise ratio of the signals is strongly improved compared to the prior art since the signals do not have to pass through the drilling fluid in the wellbore. The received response signals are stored as logging data in the electronic memory. After arrival of the casing 1 at its destined location in the wellbore, a wireline is lowered through the wellbore and latched to the latching mechanism of the housing 9. The wireline is then pulled to surface whereby the housing becomes released from the inner surface of the casing 1 and the conductor wires 14 break. The logging string is then retrieved to surface where the logging data is read out from the memory. The magnetised casing section 3 and the sets 5, 7 of coils connected thereto remain in the wellbore.

Figure 3:
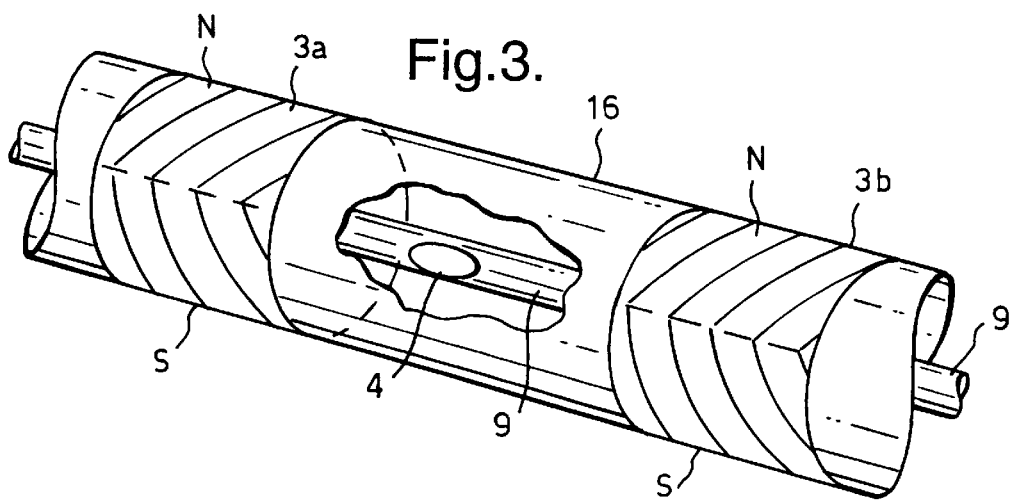
FIG. 3 schematically shows a perspective view of a second embodiment of the logging assembly according to the invention.

Referring to FIG. 3 there is shown a second embodiment of an NMR logging assembly according to the invention. The second embodiment is largely similar to the first embodiment shown in FIGS. 1 and 2, the main difference being that the antenna system 4 is arranged on the housing 9 of the logging string instead of at the casing. The casing 1 includes two magnetised casing sections 3a, 3b which are arranged at an axial distance from each other with a window casing section 16 made of glass fibre reinforced epoxy (GRE) located in-between. Each casing section 3a, 3b is similar to the magnetised casing section 3 of FIGS. 1 and 2. The antenna system 4 is located opposite the GRE window casing section 16 so that the transmitted and received RF signals pass through the GRE window casing section 16 without being significantly attenuated.

Normal operation of the second embodiment is substantially similar to normal operation of the first embodiment as described above. After the logging operation the antenna system 4 is retrieved to surface together with the housing 9 of the logging string.

Instead of reading the logging data from the electronic memory at surface, the logging data can be read out downhole via an electric conductor incorporated in the wireline, after the wireline has latched to the housing of the logging string.

Instead of using a wireline for retrieving the logging string a coiled tubing, a wash pipe, or a drill pipe can be used for that purpose. Also, the string can be retrieved by a pump-out operation.

In the above detailed description the magnetised casing section has been shown with magnetic dipoles N and S at opposite sides of a plane through the longitudinal axis of the casing. Other dipole orientations can be applied in alternative embodiments, for example magnetic dipoles at opposite sides of a plane perpendicular to the longitudinal axis of the casing.

Instead of applying conductor wires to connect the electronic system to the coils, an inductive coupling can be applied.

We claim:

1. A logging assembly for application in a wellbore formed in an earth formation, the assembly comprising
   a casing suitable to be lowered through the wellbore and to be arranged in a selected part thereof, said casing having an interior; and
   a NMR logging device comprising magnetising means for inducing a magnetic field into a selected zone of the earth formation, antenna means for transmitting radio-frequency (RF) signals into the selected zone and for receiving response RF signals from the selected zone, and data collecting means for collecting data representing the response RF signals, the data collecting means being removably arranged in the interior of the casing; wherein the means for inducing the magnetic field includes a magnetised section of the casing.

2. The logging assembly of claim 1, wherein the magnetised casing section has a tubular shape and the magnetic poles of the magnetised casing section are located at opposite sides of a plane through the longitudinal axis of the magnetised casing section.

3. The logging assembly of claim 1, wherein the antenna means includes a set of coils arranged at the outer surface of the casing, the coils being electrically connected to the data collecting means by one of an electric conductor and an inductive coupling.

4. The logging assembly of claim 1, wherein the antenna means is arranged at the housing and is located opposite a window section of said casing made of a material allowing passage of the NMR signals without substantial attenuation of the signals by the window section.

5. The logging assembly of claim 4, wherein said material includes glass fibre reinforced epoxy.

6. The logging assembly of claim 4, wherein the means for inducing the magnetic field includes two said magnetised casing sections arranged at opposite sides of the window casing section.

7. The logging assembly of claim 1, wherein the data collecting means is arranged in a housing arranged in the interior of the casing, the housing being provided with means for retrieving the housing to surface.

8. The logging assembly of claim 7, wherein the means for retrieving the housing to surface includes a latching mechanism for latching the housing to one of a coiled tubing, a wash pipe, a drill pipe and a wireline.

* * * * *